June 2, 1931.  J. A. REECE ET AL  1,807,873

METHOD AND APPARATUS FOR ROLLING SHEET GLASS

Filed Nov. 4, 1927

Inventor
Joseph A. Reece
William E. Nobbe
By Frank Fraser
Attorney

Patented June 2, 1931

1,807,873

UNITED STATES PATENT OFFICE

JOSEPH A. REECE AND WILLIAM E. NOBBE, OF TOLEDO, OHIO, ASSIGNORS TO LIBBEY-OWENS-FORD GLASS COMPANY, OF TOLEDO, OHIO, A CORPORATION OF OHIO

METHOD AND APPARATUS FOR ROLLING SHEET GLASS

Application filed November 4, 1927. Serial No. 230,937.

This invention relates broadly to the glass art and more particularly to an improved method and apparatus for rolling sheet glass.

An important object of the present invention is to provide an improved method and apparatus for facilitating the continuous feeding of a body or charge of molten glass from a molten bath to sheet rolling mechanism.

Another object of the invention is to provide a glass rolling apparatus wherein a plurality of sheet forming members are arranged in relation to a mass of molten glass to create a sheet forming pass, means being provided for supplying the requisite amount of molten glass from said mass to said sheet forming pass.

Another object of the invention is to provide apparatus for rolling sheet glass including a pair of sheet forming rolls arranged above a mass of molten glass, and rotatable means for building up a relatively large supply or body of glass which is then passed between the forming rolls and reduced to a flat sheet of substantially predetermined thickness.

A further object of the invention is to provide in a glass rolling machine, a pair of sheet forming rolls arranged above a molten source in a manner to create a sheet forming pass, and means whereby a relatively heavy body or supply of glass may be fed upwardly from the molten source to said sheet forming pass partly under hydrostatic pressure and partly by a positive feeding action.

Other objects and advantages of the invention will become more apparent during the course of the following description when taken in connecion with the accompanying drawings.

In the drawings forming a part of this application and wherein like numerals are employed to designate like parts throughout the same, Fig. 1 is a longitudinal vertical section through sheet rolling apparatus consructed in accordance with the present invention.

Figure 1:
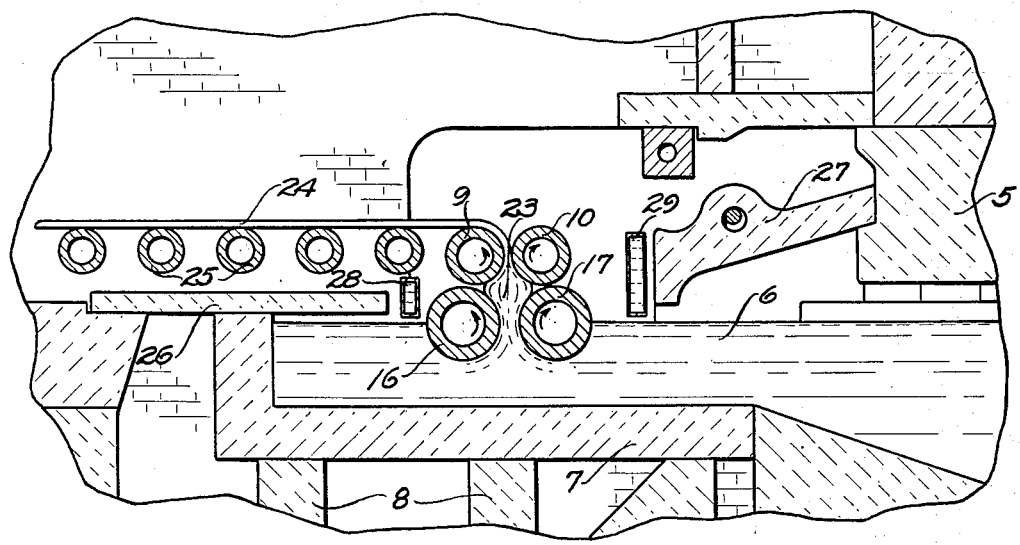
Figure 2:
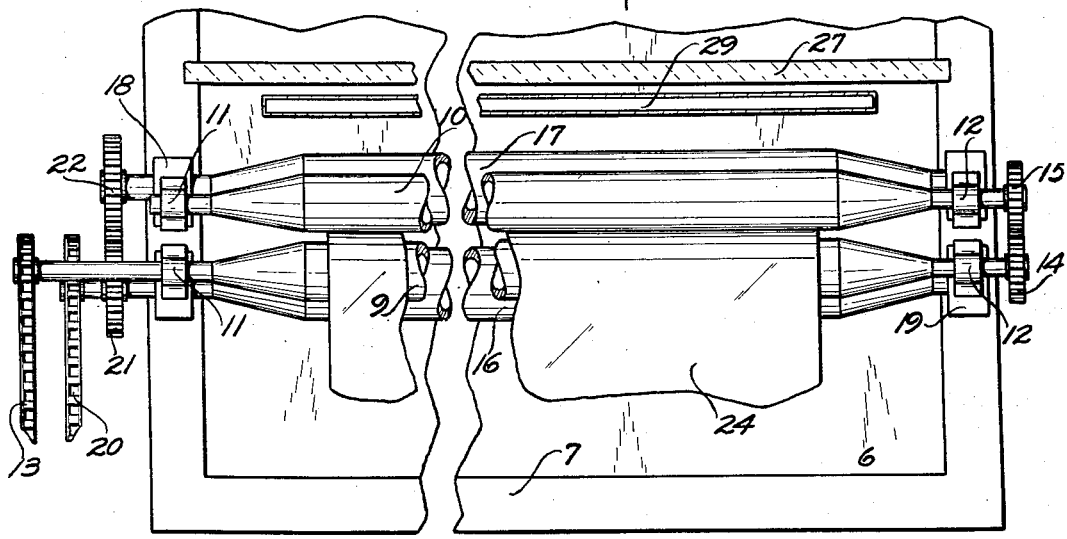
Fig. 2 is a top plan thereof.

Referring first to Figs. 1 and 2, the numeral 5 designates generally a suitable glass melting furnace wherein is produced and conditioned a large body or mass of molten glass 6 which is then caused to flow therefrom into a relatively shallow working receptacle or draw pot 7 supported upon stools 8 arranged in a heating chamber or compartment. Positioned above the mass of molten glass 6 in draw pot 7 is a pair of sheet forming rolls 9 and 10, said rolls being preferably arranged with their transverse axes in horizontal alignment and being spaced from one another to create a sheet forming pass therebetweeen, the size of this pass determining the thickness of sheet produced as will be more clearly hereinafter apparent.

The sheet forming rolls 9 and 10 are preferably hollow so that a suitable temperature control medium may be circulated therethrough as desired, the rolls being constructed of any suitable metal such as cast-iron, Monel, nichrome, stellite, etc., and having their outer surfaces ordinarily smooth and polished. The forming rolls may be supported at their opposite ends in bearings 11 and 12 with one of said rolls being positively driven such as by means of a sprocket chain 13 trained about a sprocket carried thereby, the opposite roll being driven through the intermeshing gears 14 and 15.

In order to actually roll the glass to a sheet of predetermined thickness, it is first necessary that a sufficient amount of glass be continuously supplied to the sheet forming pass between the rolls 9 and 10, so as to permit such rolling. As brought out in the above objects, the aim of the present invention is to provide means for supplying the requisite amount of molten glass to the sheet forming pass which will result in an actual rolling thereof to a flat sheet of predetermined thickness.

This is preferably accomplished by utilizing a pair of feeding rolls 16 and 17 which are arranged beneath the forming rolls 9 and 10 respectively and which are forced downwardly a desired distance into the molten glass 6. Since these rolls are disposed within the molten bath, glass will be forced upwardly therebetween under hydrostatic pressure.

The opposite ends of the feeding rolls 16 and 17 may be journaled in bearings 18 and 19 and one of the rolls is preferably positively driven by means of a sprocket chain or the like 20 trained about a sprocket carried thereby, rotation being imparted to the opposite roll by the intermeshing gears 21 and 22. The feeding rolls 16 and 17 are also made hollow so that a suitable temperature control medium may be circulated therethrough and while these have been illustrated as being of a larger diameter than the forming rolls, it will be appreciated that the relative sizes of the pairs of rolls may be varied as desired or that all of the rolls can be made the same size if preferred.

In operation, the glass is first established within the glass melting furnace 5 from which it is caused to flow into the draw pot 7. The feeding rolls 16 and 17 are then forced downwardly into the molten glass and secured in position after which the forming rolls are also arranged in place above the feed rolls. The pairs of rolls are then rotated in the direction indicated by the arrows and a sheet started upwardly therebetween by means of a bait or the like. As will be apparent, since the feed rolls are disposed within the molten bath, glass will be forced upwardly therebetween under hydrostatic pressure and also that the feed rolls, due to their rotation, will act to positively feed the glass upwardly. Thus, a relatively large body or supply of molten glass 23 is fed upwardly between the rolls 16 and 17 partly under hydrostatic pressure and partly by a positive feeding action.

The molten supply 23 will collect or be built up within a chamber or pocket formed by the coacting peripheries of the feed and forming rolls after which it is passed between the forming rolls and reduced to a sheet 24 of sustantially predetermined thickness, the said sheet being carried away upon a plurality of rolls or other suitable conveying means 25. With such an arrangement as described, a sufficiently large supply of glass will be continuously fed to the sheet forming pass to permit actual rolling thereof to a flat sheet of substantially predetermined thickness. To assist in properly conditioning the molten glass 6, and to also protect the feed and forming rolls and sheet 24, lip tiles 26 and 27 together with cooler shields 28 and 29 may be provided.

Figure 3:
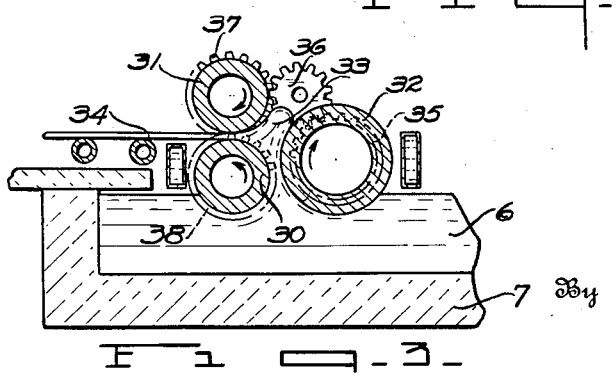
Fig. 3 is a section showing a somewhat modified type of apparatus.

In Fig. 3 is shown a somewhat modified type of apparatus wherein is provided a pair of sheet forming rolls 30 and 31 arranged one above the other and spaced to provide a sheet forming pass therebetween, the lower forming roll 30 being forced downwardly a desired distance into the mass of molten glass 6. Positioned horizontally with respect to roll 30 is a relatively larger feed roll 32 also disposed within the molten source so that a relatively heavy body or supply of glass 33 will be forced upwardly between the rolls 30 and 32 partly under hydrostatic pressure and partly by a positive feeding action created by the said rolls upon rotation thereof in the direction indicated by the arrows. The supply of glass 33 is then passed between the forming rolls 30 and 31 by which it is reduced to a flat sheet 34 of substantially predetermined thickness. The feed roll 32 is preferably positively driven and carries a gear 35 meshing with an idler gear 36 in mesh with gear 37 on roll 31, said gear 37 meshing in turn with a gear 38 on roll 30 so that upon rotation of feed roll 32, rotary movement will also be imparted to the forming rolls 30 and 31.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

We claim—

1. In sheet glass apparatus, a receptacle containing a mass of molten glass, rolling mechanism arranged thereabove, and means for supplying a relatively large body of glass upwardly to said rolling mechanism partly under hydrostatic pressure and partly by a positive feeding action.

2. In sheet glass apparatus, a receptacle containing a mass of molten glass, rolling mechanism arranged thereabove, and rotatable means for supplying a relatively large body of glass upwardly to said rolling mechanism partly under hydrostatic pressure and partly by a positive feeding action, said rolling mechanism acting to reduce the relatively large body of glass to sheet form.

3. In sheet glass apparatus, a receptacle containing a mass of molten glass, a pair of forming rolls arranged in proximity thereto in a manner to create a sheet forming pass, and rotatable means disposed within said mass for feeding a supply of glass therefrom to the forming rolls.

4. In sheet glass apparatus, a receptacle containing a mass of molten glass, a pair of forming rolls arranged in proximity thereto in a manner to create a sheet forming pass, and rotatable means disposed within said mass for supplying a relatively large body of glass to the sheet forming pass partly under hydrostatic pressure and partly by a positive feeding action.

5. In sheet glass apparatus, a receptacle containing a mass of molten glass, a pair of sheet forming rolls positioned thereabove and arranged to create a sheet forming pass, and a pair of feeding rolls arranged beneath said forming rolls and disposed within said mass for feeding upwardly therefrom a supply of glass to the sheet forming pass.

6. In sheet glass apparatus, a receptacle containing a mass of molten glass, a pair of rotatable sheet forming rolls positioned thereabove and arranged to create a sheet forming pass, and a pair of positively rotatable feeding rolls arranged beneath the forming rolls and disposed within the mass for supplying a relatively large body of glass to said sheet forming pass partly under hydrostatic pressure and partly by a positive feeding action.

7. In sheet glass apparatus, a receptacle containing a mass of molten glass, a pair of rotatable rolls disposed within said mass for feeding upwardly therefrom a relatively heavy body of glass, and a pair of rotatable forming rolls arranged above said feeding rolls for receiving the glass fed upwardly thereby and reducing it to a sheet of substantially predetermined thickness.

8. The method of producing sheet glass, which consists in establishing a mass of molten glass in a container, forcing upwardly from said mass a supply of glass partly under hydrostatic pressure and partly by a positive feeding action, and then rolling the supply of glass to a sheet of substantially predetermined thickness.

9. The method of producing sheet glass, which consists in establishing a mass of molten glass in a container, feeding upwardly from said mass into a pocket formed by a plurality of cooperating rotatable surfaces, a relatively large supply of molten glass partly under hydrostatic pressure and partly by a positive feeding action, and then rolling this glass supply to a sheet of substantially predetermined thickness.

10. The method of producing sheet glass, which consists in establishing a mass of molten glass in a container, feeding upwardly from said mass between continually rotating surfaces a relatively large supply of glass partly under hydrostatic pressure and partly by a positive feeding action, and then rolling the glass to a sheet of substantially predetermined thickness.

Signed at Toledo, in the county of Lucas and State of Ohio, this 29th day of October, 1927.

JOSEPH A. REECE.
WILLIAM E. NOBBE.